United States Patent [19]

Ewing

[11] Patent Number: 4,882,811
[45] Date of Patent: Nov. 28, 1989

[54] APPARATUS FOR PROCESSING FISH
[75] Inventor: Richard C. Ewing, Assonet, Mass.
[73] Assignee: Baader North America Corporation, New Bedford, Mass.
[21] Appl. No.: 208,661
[22] Filed: Jun. 20, 1988

Related U.S. Application Data

[62] Division of Ser. No. 920,364, Oct. 20, 1986, Pat. No. 4,761,856.

[51] Int. Cl.<sup>4</sup> .............................................. A22C 25/14
[52] U.S. Cl. .............................................. 17/58; 17/59
[58] Field of Search ................................ 17/58, 59, 61

[56] References Cited

U.S. PATENT DOCUMENTS

| | | | |
|---|---|---|---|
| 1,217,809 | 2/1917 | Nicholson | 17/58 |
| 1,224,923 | 5/1917 | Haubner | 17/58 |
| 2,526,150 | 10/1950 | Oates | 17/58 |
| 3,456,287 | 7/1969 | Oates et al. | 17/59 |
| 3,561,044 | 2/1971 | Evich | 17/58 X |
| 4,091,506 | 5/1978 | Sorensen et al. | 17/58 X |
| 4,535,509 | 8/1985 | Bullock et al. | 17/58 |
| 4,563,793 | 1/1986 | Ryan | 17/58 |

Primary Examiner—Willis Little
Attorney, Agent, or Firm—Thomas R. Morrison

[57] ABSTRACT

A fish eviscerating apparatus employs at least one rotating brush for removing viscera from a beheaded, belly-slit fish. Bristles of the at least one brush have a length and stiffness which, when combined with a predetermined brush holdown, force, are effective for removing a predetermined portion of viscera. A water jet may be integrated with the brush for aiding the cleaning of the fish body cavity. In one embodiment, one rotating brush is controlled to contact the forward end of the body cavity with a stiff holddown force for removing the fish swim bladder and assorted viscera in the vicinity thereof and a second brush with softer bristles is controlled with less stiff holddown force for contacting and cleaning viscera and other debris from substantially the entire body cavity. A water jet cleans a dark, mucous-like liner from the inner surfaces of the belly flaps of the fish. Initial abrasion by the rotating brush, or branches, aids the cleaning action of the water jet. A pressure roller forces the dorsal fin of the catfish through a slot. A cutting knife is timed to remove the dorsal fin without sacrificing a significant amount of flesh. A snaggle, having a plurality of backward-pointing pins on its inner surfaces, engages and pulls free an intestinal fragment to complete the cleaning of the fish.

19 Claims, 9 Drawing Sheets

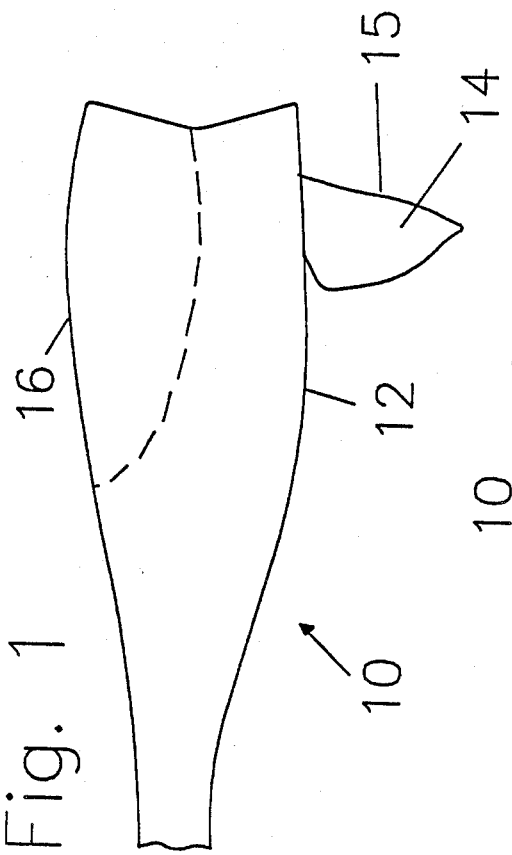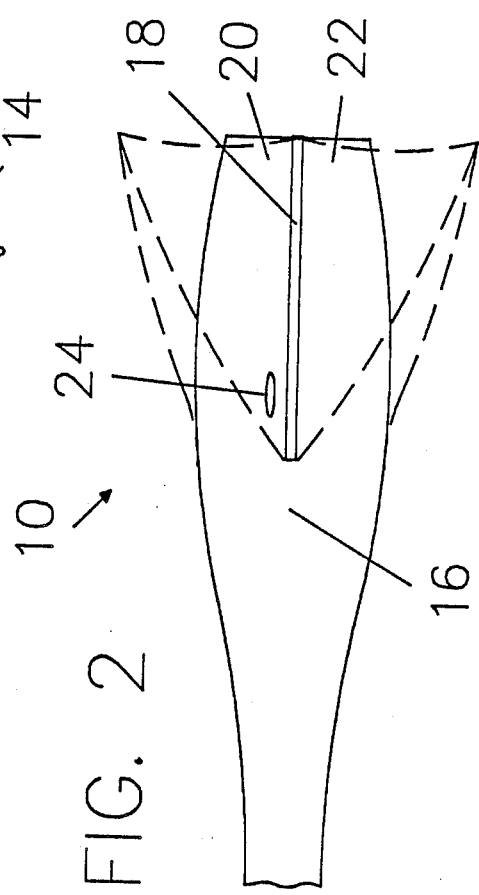

APPARATUS FOR PROCESSING FISH

BACKGROUND OF THE INVENTION

The present invention relates to fish processing machinery and, more particularly, to machinery for eviscerating and removing a dorsal fin of fish.

Although the present invention may have applicability to processing other types of fish, for concreteness of description, the invention is illustrated and described in an embodiment especially suited to processing channel catfish (Ictalurus Punctatus).

Conventional catfish processing includes removing the head, slitting the belly cavity, cleaning the viscera from the belly cavity, and skinning the cleaned fish for market. Such conventional processing, besides being extremely labor intensive, fails to produce a cleaned fish having all of the attributes desired by consumers.

In the most primitive practice, the catfish first are immobilized by electric shock to avoid worker injury from the sharp dorsal and pectoral spikes. Next, their heads are removed using a bandsaw and their belly cavities are manually slit with a knife. The viscera are drawn from the body cavity with the help of a vacuum hose. Finally, the skin is removed by a hand-fed conventional mechanical skinner.

In a more modern process, the head-removal and belly-slitting procedures are done with conventional automated machinery to deliver beheaded and bellyslit fish to the remaining operations.

The eviscerating operation using a vacuum hose requires substantial human effort to complete. Parts of catfish viscera are extremely tough and well attached to the remainder of the fish. For example, a swim bladder in the forward part of the beheaded fish is tough, resilient, and difficult to remove. In addition, a portion of the intestine remains firmly attached to the anal vent at one side or the other of the belly slit. To remove these items, the worker must clamp the item to the vacuum hose nozzle with one hand while holding the remainder of the fish with the other. Such manual processes substantially slow the eviscerating operation and contribute to worker fatigue.

Even when completely eviscerated, catfish cleaned by the above process have certain properties which limit their sales appeal. For example, the belly cavity of a catfish is lined with a dark layer which many fish buyers find unattractive or unappetizing. In addition, an undesirable amount of blood and debris conventionally remain in the body cavity, especially in the vicinity of the spine and near the rear end of the body cavity.

The pectoral fins of a catfish may be removed as part of beheading. The dorsal fin presents several difficult problems. Dorsal-fin removal is important since the dorsal fin contains a stiff, sharp spike whose presence in the dressed fish not only reduces the attractiveness of the product but also presents a safety problem. The leading edge of the dorsal fin is attached to the back of the catfish by a triangular bone plate which must be removed along with the fin. To maintain the yield of flesh from the dressed fish excessively deep cuts to remove the dorsal fin and triangular bone plate should be avoided.

OBJECTS AND SUMMARY OF THE INVENTION

It is an object of the invention to provide apparatus for eviscerating a fish.

It is a further object of the invention to provide apparatus for removing a layer from an internal surface of a fish belly.

It is a still further object of the invention to provide a water jet having a pressure, spray fan angle, spray axis angle, nozzle distance, water pressure, and droplet size effective for removing an inner liner of a fish belly cavity.

It is a still further object of the invention to provide apparatus for removing a swim bladder from a fish.

It is a still further object of the invention to provide a rotating brush and control thereof having a brush stiffness, rotation and control effective for removing a swim bladder from a fish.

It is a still further object of the invention to provide a rotating brush and control thereof having a brush stiffness, rotation and control effective for removing viscera and cleaning an interior of a belly cavity of a fish without damaging flesh of the fish.

It is a still further object of the invention to provide means for removing a dorsal fin of a fish.

It is a still further object of the invention to provide apparatus for removing a portion of a fish intestine affixed to its anal vent.

It is a still further object of the invention to provide fish processing apparatus including at least one rotating brush for removing at least a part of the viscera of a fish, and a water jet cooperating with said brush for removing an inner liner from a belly cavity of said fish.

Briefly stated, the present invention provides a fish eviscerating apparatus employing at least one rotating brush for removing viscera from a beheaded, belly-slit fish. Bristles of the at least one brush have a length and stiffness which, when combined with a predetermined brush holddown force, are effective for removing a predetermined portion of viscera. A water jet may be integrated with the brush for aiding the cleaning of the fish body cavity. In one embodiment, one rotating brush is controlled to contact the forward end of the body cavity with a stiff holddown force for removing the fish swim bladder and assorted viscera in the vicinity thereof and a second brush with softer bristles is controlled with less stiff holddown force for contacting and cleaning viscera and other debris from substantially the entire body cavity. A water jet cleans a dark, mucous-like liner from the inner surfaces of the belly flaps of the fish. Initial abrasion by the rotating brush, or brushes, aids the cleaning action of the water jet. A pressure roller forces the dorsal fin of the catfish through a slot. A cutting knife is timed to remove the dorsal fin without sacrificing a significant amount of flesh. A snaggle, having a plurality of backward-pointing pins on its inner surfaces, engages and pulls free an intestinal fragment to complete the cleaning of the fish.

According to an embodiment of the invention, there is provided apparatus for processing fish, the fish having had its head removed and its belly slit, comprising: a conveyor, the conveyor including means for moving the fish along a predetermined path with the belly uppermost, at least one processing station, the at least one processing station including a rotating brush, means for spreading belly flap of the fish to reveal an interior of the belly, and means for controlling a position of the rotating brush for bringing a perimeter thereof into contact with a predetermined portion of the interior whereby at least a portion of viscera are removed from the interior.

According to a feature or one invention, there is provided apparatus for removing an inner liner from an interior of a fish comprising: first and second nozzles, means for spreading belly flaps of the fish, means for moving the fish past the first and second nozzles, means for delivering a flow of liquid at a predetermined pressure to the first and second nozzles, and means for supporting the first and second nozzles at a distance from the fish, at a roll angle, and at a yaw angle effective, in combination with the flow of liquid for removing the inner liner.

According to a further feature of the invention, there is provided apparatus for processing fish, the fish having had its head removed and its belly slit, comprising: a conveyor, the conveyor including means for moving the fish along a predetermined path with the belly uppermost, at least one processing station, the at least one processing station, the at least one processing station including a rotating brush, means for spreading belly flap of the fish to reveal an interior of the belly, means for controlling a position of the rotating brush for bringing a perimeter thereof into contact with a predetermined portion of the interior whereby at least a portion of viscera are removed from the interior, an inner liner removal station, means for holding the belly flaps in a spread position, means for producing a predetermined pressure in a liquid, means for producing at least one spray fan of the liquid contacting the inner liner, and the predetermined pressure and the means for producing at least one spray fan being effective, in combination for removing the inner liner.

According to a still further feature of the invention, there is provided apparatus for removing a dorsal fin from a fish comprising: a conveyor, a generally V-shaped support for a back of the fish, a longitudinal slot in the V-shaped support effective for permitting the dorsal fin to protrude at least partly therethrough, a pressure roller generally aligned with the longitudinal slot, means for urging the pressure roller into contact with an interior of the fish whereby the dorsal fin is urged through the longitudinal slot, a rotating cutting knife at a side of the V-shaped support remote from the fish, means for urging the rotating cutting knife into a cutting position in synchronism with the dorsal fin arriving in a predetermined location with respect to a cutting edge of the knife, and the means for urging further including means for removing the cutting edge from the cutting position a predetermined time after the dorsal fin has travelled therepast.

According to a still further feature of the invention, there is provided apparatus for processing a fish comprising: at least one rotating brush, a conveyor including means for moving the fish past the rotating brush, means for opening belly flaps of the fish as it moved toward the rotating brush, means for urging the rotating brush into contact with a predetermined portion of an interior of the fish, first and second nozzles, means for spreading belly flaps of the fish, the means for spreading being disposed adjacent the means for opening whereby the belly flaps opened by the means for opening for contact of the rotating brush with the interior remain opened and are spread by the means for spreading, means for moving the fish past the first and second nozzles, means for delivering a flow of liquid at a predetermined pressure to the first and second nozzles, and means for supporting the first and second nozzles at a distance from the fish, at a roll angle, and at a yaw angle effective, in combination with the flow of liquid for removing the inner liner.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a side view of a portion of a catfish with its facing upward.

FIG. 2 a top view of the catfish of FIG. 1 illustrating, a belly slit, with the outline of the belly flaps in their opened position shown in dashed line.

DETAILED DESCRIPTION OF THE PREFERRED EMBODIMENT

Figure 3:
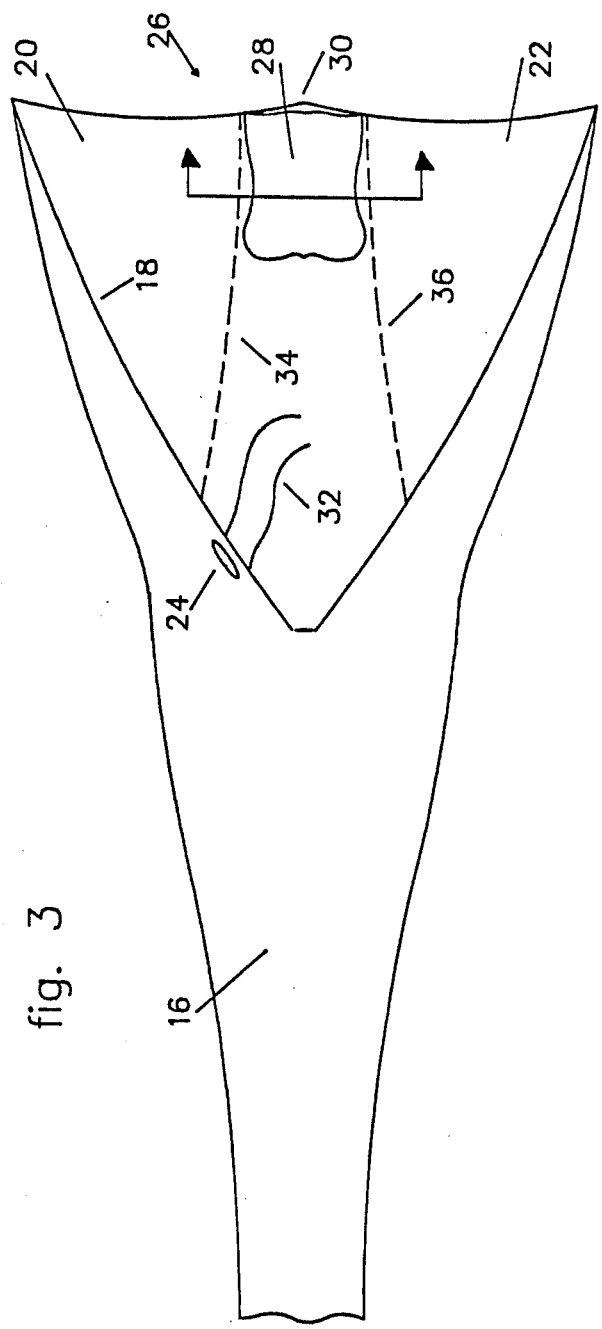
FIG. 3 is an enlarged view of the catfish of FIG. 2 shown with its belly flaps opened and significant areas within its belly cavity identified.

Referring now to FIGS. 1 and 2, there is shown a beheaded, belly-slit catfish 10 ready for processing by the apparatus of the present invention. Catfish 10 includes a back 12 having a dorsal fin 14 attached thereto. A forward edge 15 of dorsal fin 14 contains a stiff, sharp dorsal spike (not shown) whose removal is necessary for safety and marketability of the processed catfish. A belly 16 of catfish 10 includes a belly slit 18 formed by any convenient technique prior to delivering catfish 10 to the apparatus of the present invention. Belly slit 18 permits belly flaps 20 and 22 to be spread outward from their solid-line positions to their dashed-line positions during processing to expose substantially an entire body cavity 26 of catfish 10, as will be explained. An anal vent 24 is disposed in belly 16 on one side or the other of belly slit 18, depending on its location when belly slit 18 is formed.

Referring now to FIG. 3, body cavity 26, revealed by spreading belly flaps 20 and 22, contains a swim bladder 28 near a forward end 30 of beheaded catfish 10. Swim bladder 28 is tough, resilient, and firmly attached in body cavity 26. A tough, resilient intestinal fragment 32 is firmly affixed at its downstream end to belly 16 at anal vent 24. Assorted viscera (not show in detail) are also disposed in body cavity 26 within a volume outlined generally by dashed lines 34 and 36.

The problems to be solved by the present invention include removing swim bladder 28, removing the assorted viscera, removing intestinal fragment 32, removing a black mucous-like layer from the interior surfaces of body cavity 26, cleaning blood and other debris from body cavity 26, and removing dorsal fin 14 (FIG. 1). The following description details a specific sequence, but one skilled in the art will recognize that, except as otherwise noted, the operations in the sequence may be performed in a different order without departing from the spirit and scope of the invention.

Figure 4:
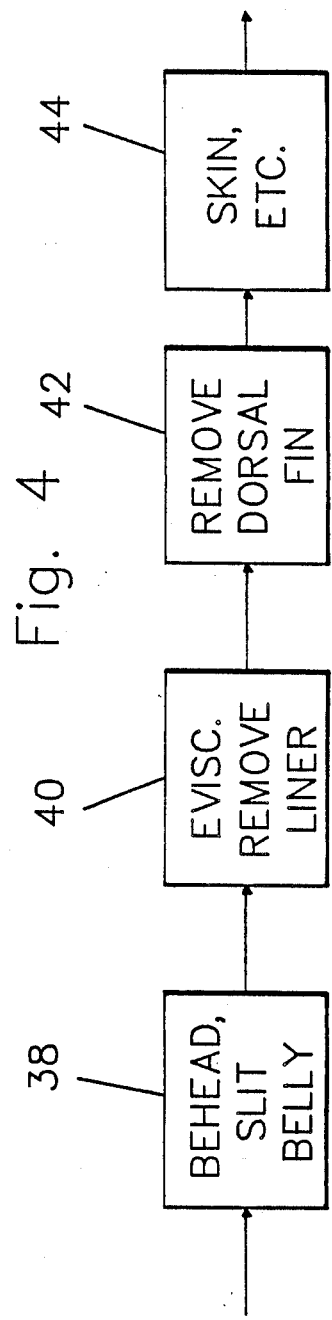
FIG. 4 is a simplified block diagram of the process for preparing a fish for market.

Referring now to FIG. 4, a simplified functional block diagram of the entire fish processing operation is shown. A conventional beheading and belly slitting apparatus 38 which may be, for example, a Baader model 166c machine, prepares catfish for an eviscerator and lining remover 40 according to the present invention. After evisceration, the dorsal fin is removed by a dorsal fin cutter 42 according to the present invention. The resulting catfish may receive additional finishing in, for example, a skinner 44. Alternatively, instead of, or in addition to, skinning, other operations such as, for example, filleting, transverse cutting into steaks, freezing, packing and shipping, may be performed, alone or in combination, on the cleaned fish.

Figure 5:
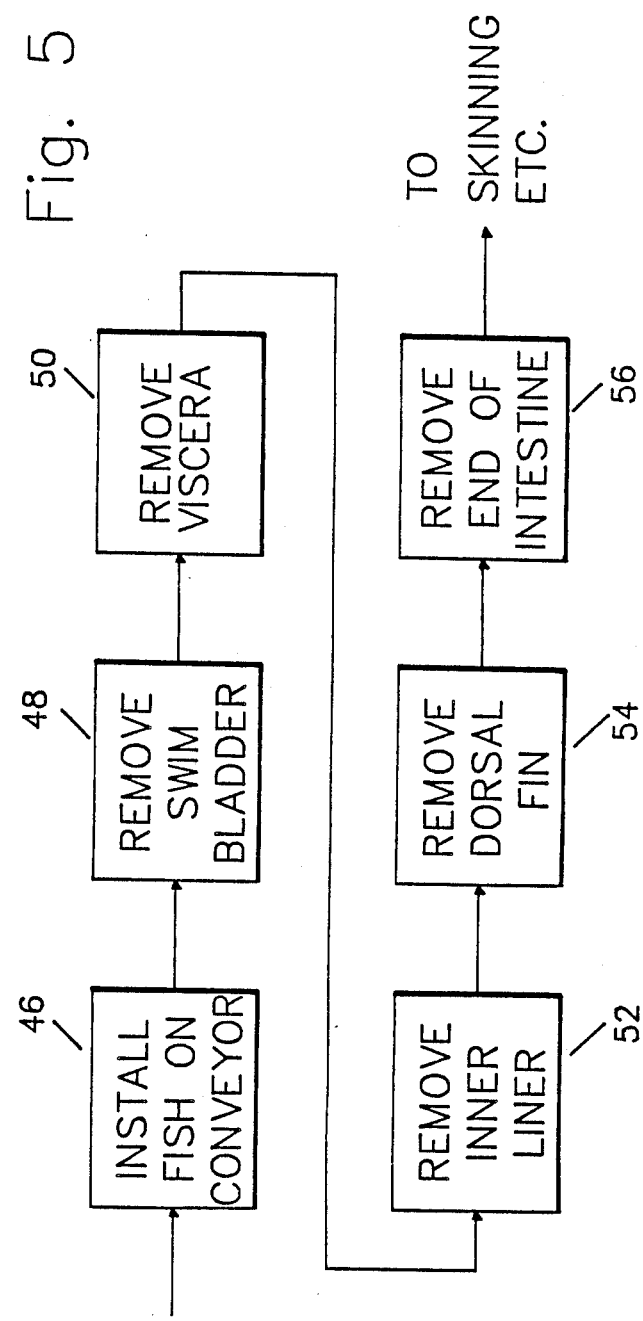
FIG. 5 is block diagram of the eviscerating and dorsal-fin-removal portions of the process of FIG. 4.

Referring now to FIG. 5, a functional flow of operations in eviscerator and lining remover 40 and dorsal fin cutter 42 is shown. A beheaded, belly-slit catfish is first installed on a conveyor as indicated by a box 46. As will be explained hereinafter, the conveyor is preferably a pin-type conveyor having facing pointed pins on a pair of endless chains for piercing the flesh of the catfish, thereby securely affixing and moving it at a predetermined rate through the remaining operations. The swim bladder of the catfish is then removed as indicated by a swim bladder removal processing station 48. Next, the viscera are then removed as indicated by a viscera removal processing station 50. Then, the black inner liner is removed as indicated by a inner liner removal processing station 52 before removing the dorsal fin as indicated in a dorsal fin removal processing station 54. Finally, the intestinal fragment is removed as indicated by an intestine removal processing station 56 before passing the catfish to subsequent operations not of concern to the present disclosure.

Figure 6:
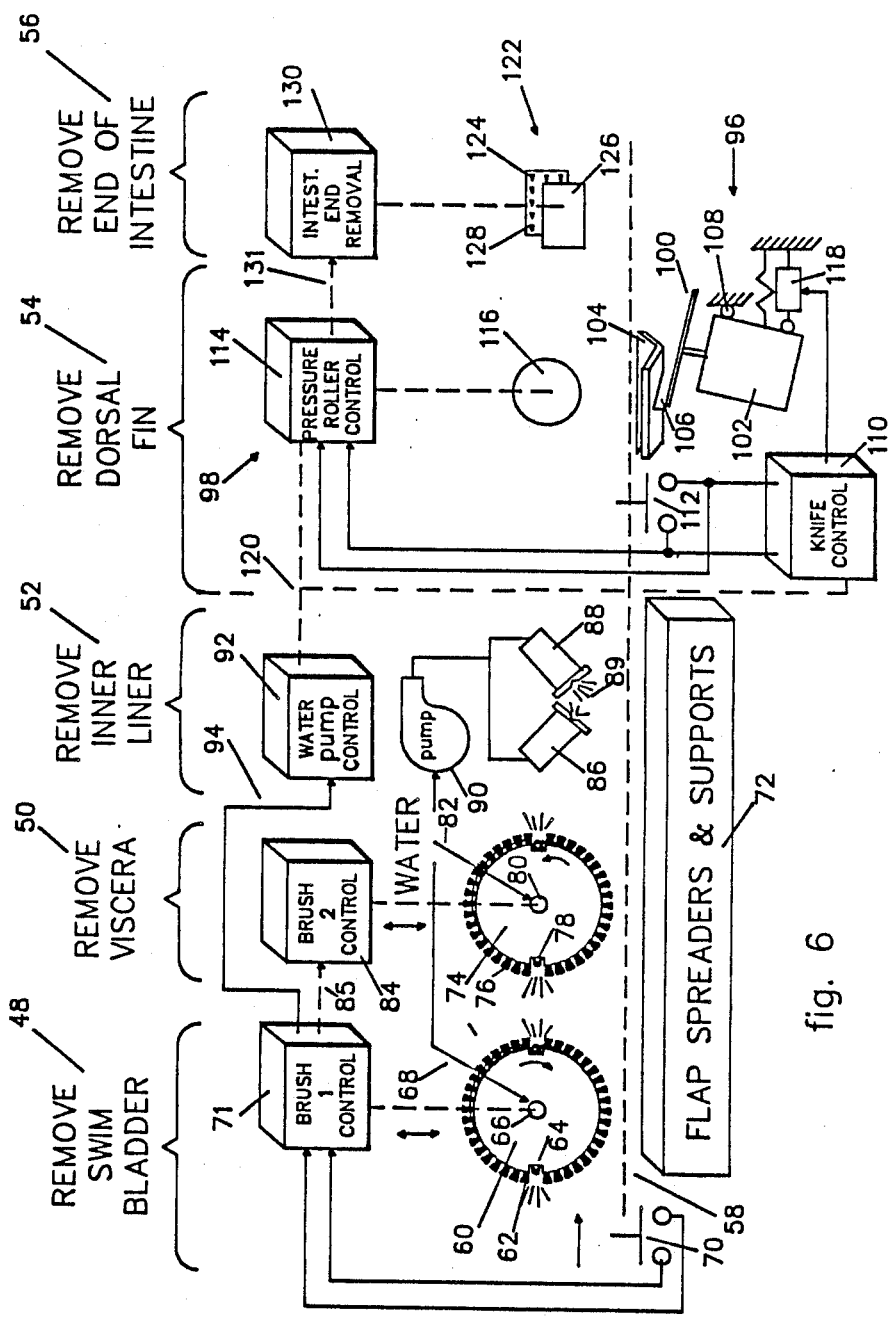
FIG. 6 is a simplified schematic diagram of the system of FIG. 5.

Referring now to FIG. 6, a simplified schematic diagram of the apparatus of the present invention is shown with the functions defined in FIG. 5 indicated along the top. A pin-type conveyor 58, indicated by a dashed line, moves fish through the processing stations at a predetermined speed. Pin-type conveyor 58 will be further detailed in the following description. Swim bladder removal processing station 48 includes a rotating brush 60 having a plurality of bristle tufts 62 distributed about its circumference. At least one, and preferably two, water nozzles 64 are recessed within the circumference of rotating brush 60 for delivering a spray of water received through a rotary seal 66 from a water supply line 68.

A sensor switch 70, of any convenient type, is actuated by forward end 30 (FIG. 3) of a catfish to produce a master timing signal for application to a brush control system 71. Rotating brush 60 is driven by conventional means to rotate against the direction of travel of the catfish. It is normally maintained in an elevated position by brush control system 71 until a first predetermined time after the master timing signal is generated by sensor switch 70. Then, brush control system 71 moves rotating brush 60 downward into contact with body cavity 26 of a catfish. At a second predetermined time after the master timing signal is generated, brush control system 71 raises rotating brush 60 up and out of contact with body cavity 26.

Referring momentarily also to FIG. 3, the time during which rotating brush 60 is held in contact with body cavity 26 corresponds roughly to the time during which bristle tufts 62 are in contact with the region occupied by swim bladder 28. The hold-down force applied by brush control system 71, and the bristle stiffness of bristle tufts 62 are sufficient, in combination, to dislodge and fling away swim bladder 28 and viscera located nearby. The flesh of catfish 10 rearward and to the sides of swim bladder 28 is sufficiently fragile that it would be damaged if it were contacted by the stiff bristle tufts 62, under the firm hold-down force required to remove swim bladder 28. Thus, the width of rotating brush 60 is limited so that the swath contacted by bristle tufts 62 of rotating brush 60 avoids the tender flesh on belly flaps 20 and 22. In addition, rotating brush 60 is raised to a non-contacting position by brush control system 71 before the more fragile flesh of catfish 10 at the rear of body cavity 26 is damaged. Flap spreaders and supports 72 cooperate with swim bladder removal processing station 48, as well as subsequent operations, to spread the belly flaps and to support them as required by particular operations. The configuration and operation of elements of flap spreaders and supports 72 will be described in connection with the description of individual operations.

Once swim bladder 28 is removed, the remaining viscera in body cavity 26 are relatively easily removed, except for intestinal fragment 32. Viscera removal processing station 50 includes a rotating brush 74 having a plurality of bristle tufts 76 about its circumference. Rotating brush 74 optionally includes at least one and preferably two water nozzles 78 recessed in its circumference at radii less than the radii of the outer ends of bristle tufts 76. Water may be delivered to water nozzles 78 through a rotary seal 80 from a water supply line 82.

A brush control system 84 controls the vertical position of rotating brush 74 for its viscera-removal function. Rotating brush 74 rotates in the forward direction of catfish travel on pin-type conveyor 58. Bristle tufts 76 are sufficiently soft, and the hold-down force provided by brush control system 84 is sufficiently light, that bristle tufts 76 may be permitted to remain in contact with body cavity 26 all the way to the rear of body cavity 26 without damaging the flesh of catfish 10. This permits rotating brush 74 to remove all of the easily removed viscera all the way to the rear of body cavity 26, generally covering the entire region between dashed lines 34 and 36. Thus, in addition to removing the viscera, rotating brush 74 is effective for scouring the entire central portion of body cavity 26 for removal of blood and other debris which may remain from preceding operations.

It will be recognized from the preceding that rotating brush 60 and rotating brush 74 are constructed and controlled to perform distinct operations which, in combination, complete the removal of swim bladder 28 and miscellaneous viscera from body cavity 26, as well as performing a general cleanup of the interior of body cavity 26. It should be noted that the sequence of rotating brush 60 and rotating brush 74 may be reversed without departing from the scope of the invention.

Brush control system 84 may control the vertical position in an active manner related to the time at which the master timing signal is generated by sensor switch 70. Such active control is indicated by a control signal line 85 between brush control system 71 and brush control system 84. Brush control system 84 may contain a conventional timer (not shown) effective to lower and raise rotating brush 74 in a predetermined relationship to the time that rotating brush 60 is controlled. The known speed of pin-type conveyor 58 permits fixed timing intervals to be employed. Alternatively, brush control system 84 may consist of a conventional mechanical balance system (not shown) for permitting rotating brush 74 to move upward when the rear of body cavity 26 is reached. In the preferred embodiment, the normal position of rotating brush 74 is in its lower position and it is permitted to rise upward by a spring or gravity counterbalance system when the rear of body cavity 26 is contacted. In this way, the full length of the interior of body cavity 26 is cleaned by rotating brush 74 without requiring a timing signal from sensor switch 70 or brush control system 71.

As has been noted above, the interior of body cavity 26 is coated with a dark, or black, mucous-like layer which adversely affects the marketability of catfish to those unfamiliar with the product. Inner liner removal processing station 52 removes this dark liner. First and second spray nozzles 86 and 88 receive pressurized water from a water pump 90. Spray fans 89 of water from spray nozzles 86 and 88 are directed at predetermined angles and from predetermined distances at the portions of belly flaps 20 and 22 lying outside dashed lines 34 and 36 (FIG. 3). With a properly selected water pressure and fan angle of the spray fans 89 from spray nozzles 86 and 88, the entire dark layer is removed.

Water pump 90 may be driven full time to provide continuous water sprays whether or not a catfish is present to receive it. Since waste water from spray nozzles 86 and 88 should not be recycled for sanitary reasons, water conservation may make it preferable that water pump 90 be actuated to provide full pressurized water flow only when a catfish is present to be cleaned. Thus, a water pump controller 92 is preferably provided to receive a timing signal from brush control system 71 on a line 94 indicating the time at which a catfish will pass spray nozzles 86 and 88. Water pump controller 92 contains a timer for energizing water pump 90 a predetermined time after forward end 30 (FIG. 3) of catfish 10 passes sensor switch 70. This predetermined time is preferably established at a time sufficiently in advance of the arrival of catfish 10 to permit water pump 90 to develop full-pressure delivery of water through spray nozzles 86 and 88.

Dorsal fin removal processing station 54 includes a knife subsystem 96 and a pressure roller subsystem 98. Knife subsystem 96 includes a rotary knife 100 driven by a knife motor 102. A V-shaped support 104, part of flap spreaders and supports 72, includes a notch 106. Knife motor 102 is pivoted at a pivot 108 to permit rotary knife 100 to enter notch 106. A knife control circuit 110 receives a timing signal from a sensor switch 112 indicating the arrival of forward end 30 (FIG. 3) of catfish 10. Knife control circuit 110 provides a control signal to a pressure roller controller 114 which, a predetermined time thereafter, urges a pressure roller 116 into contact with the interior of body cavity 26. A knife actuator 118 receives an appropriately timed control signal from knife control circuit 110 for urging rotary knife 100 upward into its active position for removing a dorsal fin of catfish 10. Knife control circuit 110 includes appropriate timers for moving rotary knife 100 into its active position a predetermined time after sensor switch 112 senses the presence of catfish 10. In addition, the timer in knife control circuit 110 is effective for removing the actuating signal from knife actuator 118 at an appropriate time for avoiding excessive loss of flesh from catfish 10.

In an alternate embodiment of the invention, sensor switch 112 may be eliminated and a master timing signal derived from sensor switch 70 may be relied on for controlling the timing of pressure roller controller 114 and knife control circuit 110. This option is indicated by a dashed line 120. It is presently considered that the timing of actuation of knife actuator 118 is important in attaining precise removal of the dorsal fin without excessive waste of flesh. Thus, inclusion of sensor switch 112 appears justified. Subsequent experience or development may indicate that the single master timing signal provided by sensor switch 70 may be sufficient for timing all operations with the application of suitable delays using conventional timing devices.

As will be further detailed hereinafter, pressure roller 116 functions to ensure that the dorsal fin of catfish 10 is properly positioned in notch 106 for the removal thereof.

It has been discovered that the foregoing operations are successful in removing intestinal fragment 32 about 20 percent of the time. Also, whenever the foregoing operations fail to remove intestinal fragment 32, intestinal fragment 32 invariably extends out from body cavity 26 and hangs down over one side or the other of catfish 10. Intestine removal processing station 56 takes advantage of this known position of intestinal fragment 32. A snaggle 122, consists of first and second snaggle plates 124 and 126 disposed on either side of pin-type conveyor 58 to contact the sides of catfish 10 as it is carried therepast. Each snaggle plate includes a plurality of back-pointing pins 128 on its inner surface. As catfish 10 is drawn through snaggle 122, one or more of back-pointing pins 128 penetrate intestinal fragment 32 (FIG. 3) for firm attachment thereto. Continued travel of catfish 10 beyond snaggle 122 pulls intestinal fragment 32 free from its attachment to anal vent 24 (FIG. 3), thus completing the evisceration, interior cleanup and dorsal fin removal of catfish 10.

A catfish has a tough, scale-less skin capable of withstanding abrasion by snaggle 122 without visible damage. Particularly where the skin is removed in a subsequent skinning operation, snaggle 122 may be passive with snaggle plates 124 and 126 spring-loaded toward the center of pin-type conveyor 58 for removing intestinal fragment 32. In a more preferred embodiment, an intestine-removal control 130 may be provided for moving snaggle plates 124 and 126 into contact with catfish 10 at the time intestinal fragment 32 is expected to pass therebetween. A timing signal for intestine-removal control 130 may be derived from any convenient sensor such as, for example, sensor 70 or a special sensor switch 112. Intestine-removal control 130 may contain appropriate timing circuits for timing the motion of snaggle plates 124 and 126 or an appropriately timed signal may be generated in brush control system 71, brush control system 84, water pump controller 92, or pressure roller controller 114 (the optional timing signal from pressure roller controller 114 is indicated by a dashed line 131).

Figure 7:
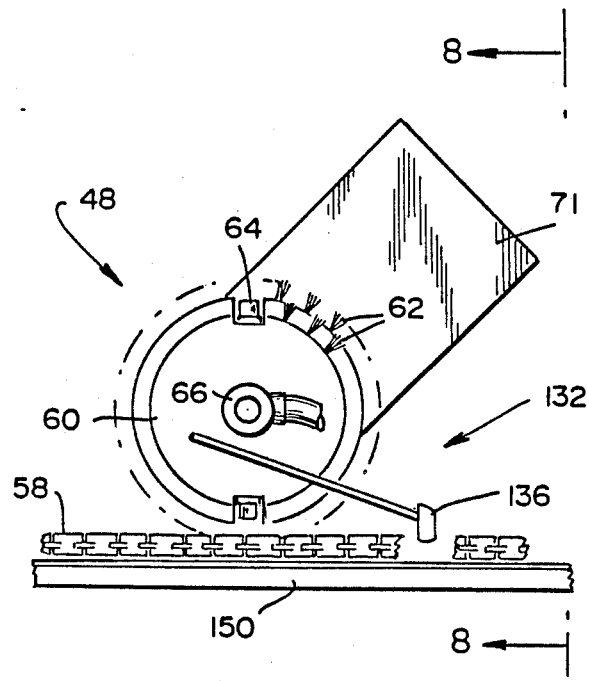
FIG. 7 is side view of the swim bladder removal processing station of FIG. 6.
Figure 8:
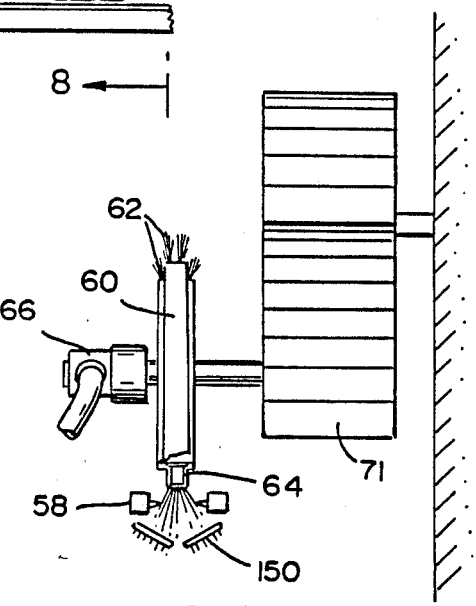
FIG. 8 a view taken along VIII—VIII of FIG. 7.
Figure 9:
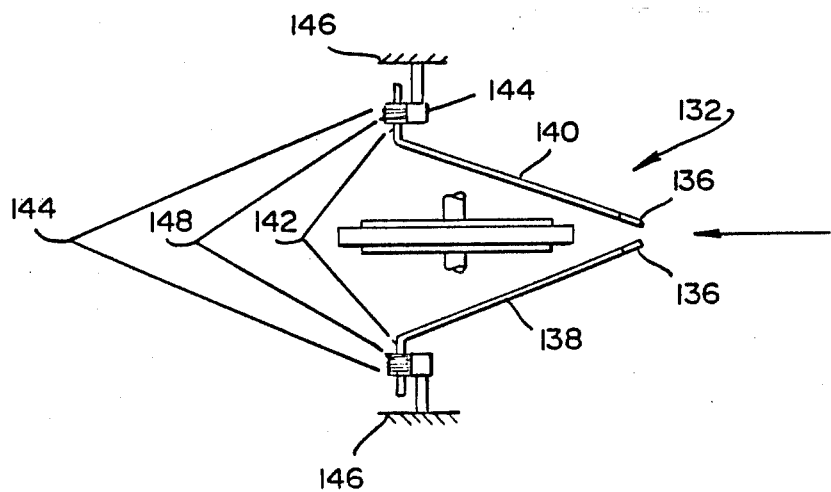
FIG. 9 a view taken along IX—IX of FIG. 7.

Referring now to FIGS. 7, 8 and 9, swim bladder removal processing station 48 contains, in addition to the elements previously identified, belly-flap spreaders 132 for opening and spreading the belly flaps of catfish 10 before it arrives at rotating brush 60. Belly-flap spreaders 132 include first and second diverging legs 138 and 140 (diverging leg 140 is hidden behind diverging leg 138 in FIG. 7). Shafts 142 of legs 138 and 140 are pivoted at pivots 144 to fixed support structures 146. Resilient means such as, for example, tension springs 148 is connected between shaft 142 and support structure 146 for urging legs 138 and 140 downward toward an advancing catfish 10. An angled bottom support 150 (FIG. 8) supports the back of catfish 10 as they are moved along by pin-type conveyor 58, thereby supporting catfish 10 against the downward force applied by rotating brush 60.

Referring now also to FIG. 3, as a catfish 10 approaches spreaders 132, entry blades 136 enters body cavity 26 between belly flaps 20 and 22. With further advance, diverging legs 138 and 140 open belly flaps 20 and 22, laying them flat into the condition indicated in FIG. 3 just before forward end 30 of catfish 10 is contacted by rotating brush 60. Generally horizontal support plates (not shown) may optionally be provided for supporting belly flaps 20 and 22.

Bristle tufts 62 are short and stiff and their transverse dimension is relatively narrow. In addition, brush control system 71 raises rotary seal 66 about the time that the rear end of swim bladder 28 passes below it. In this manner, swim bladder 28, and miscellaneous viscera (not shown) in the vicinity of swim bladder 28 are removed without damaging the more fragile flesh on the insides of belly flaps 20 and 22 and rearward of swim bladder 28. At least some vigorous abrasion takes place in the front center of body cavity 26 below swim bladder 28. The limited width of bristle tufts 62 confines the abrasion to the vicinity of the spine (not shown) of catfish 10. This area of body cavity 26 is relatively rugged and is not damaged by the short stiff bristles of bristle tufts 62.

The vigorous scrubbing in the narrow region near forward end 30 has another desirable effect which becomes evident in a later operation. That is, the vigorous scrubbing breaks down and removes the black mucous-like inner liner in its contact area. It is believed that this initial break in the black inner liner may make it easier to remove the remainder of the black inner liner in subsequent operations.

Although different characteristics may be required by different fish, an embodiment of the invention has been found to give satisfactory results wherein each bristle of bristle tufts 62 projects from about 0.5 to about 1.0 inches from rotating brush 60 and has a bristle diameter of from about 0.018 to about 0.029 inches. Rotating brush 60 has a diameter of from about 6 to about 8 inches with a total width between the outside edges of bristle tufts 62, seen in the side view of FIG. 8, of from about 0.33 to about 0.55 inches. Rotating brush 60 is preferably rotated at a speed of 900 RPM and is held down into contact with catfish 10 with a hold-down force of from about 30 to about 50 pounds.

Rotating brush 74 (FIG. 6) is similar to rotating brush 60 except that its bristles are softer with a wider swath of contact and its rotational direction is reversed to run in the same direction as pin-type conveyor 58. Thus, rotating brush 74 is not separately illustrated. In addition, brush control system 84 may be the same as brush control system 71 except for the longer period during which contact is made. Alternatively, and preferably, brush control system 84 is a counterbalance providing a light holddown force at all times. Due to the forward rotational direction, rotating brush 74 tends to ride up at the rear of body cavity 26 (FIG. 3). The light holddown force and the softer bristles of rotating brush 74 prevent damage to the fragile flesh near the rear of body cavity 26, but permit rotating brush 74 to clean the entire central portion of body cavity 26 including the spine, and both sides of the spine of blood and intestinal debris.

As in the case of rotating brush 60, other characteristics may be employed in rotating brush 74 for different applications. In one embodiment each bristle of bristle tufts 62 projects from about 0.75 to about 1.5 inches from rotating brush 74 and has a bristle diameter of from about 0.008 to about 0.0197 inches. Rotating brush 74 has a diameter of from about 6 to about 8 inches and a total width between the outside edges of bristle tufts 62, seen in a side view corresponding to FIG. 8, of from about 0.4 to about 0.75 inches. Rotating brush 74 is preferably rotated at a speed of 900 RPM and is held down into contact with catfish 10 with a hold-down force of from about 5 to about 10 pounds.

It should be noted that the cooperation between rotating brush 60 and rotating brush 74 is useful in cleaning the entire body cavity 26. It should not be assumed, however, that absence of one of these elements would cause the result to depart from the scope and spirit of the invention. For example, rotating brush 60 may have two sets of bristle tufts 62, one set having the characteristics recited for rotating brush 60 and the other set having the characteristics recited for rotating brush 74. The holddown force may be modulated by brush control system 71 to apply a firm force early in the cleaning operation, thereby urging stiff bristle tufts 62 into contact with swim bladder 28 (FIG. 3) and later reducing the holddown force to leave only the softer bristles corresponding to those on rotating brush 74 in contact until the rear end of body cavity 26 is reached.

Also, additional stations corresponding to swim bladder removal processing station 48 and/or viscera removal processing station 50 may be added without departing from the spirit and scope of the invention. For example, in some applications it is useful to add an additional viscera removal processing station 50 upstream of swim bladder removal processing station 48 to perform preliminary removal of viscera before swim bladder removal processing station 48 removes swim bladder 28. This affords a useful amount of redundancy to the operation of the overall apparatus. Since such an additional viscera removal processing station is identical to viscera removal processing station 50 illustrated and described, it is considered that further description thereof is unnecessary.

Although not necessary to all embodiments of the invention, it improves efficiency to integrate the functions of viscera removal processing station 50 and inner liner removal processing work station 52.

Figure 10:
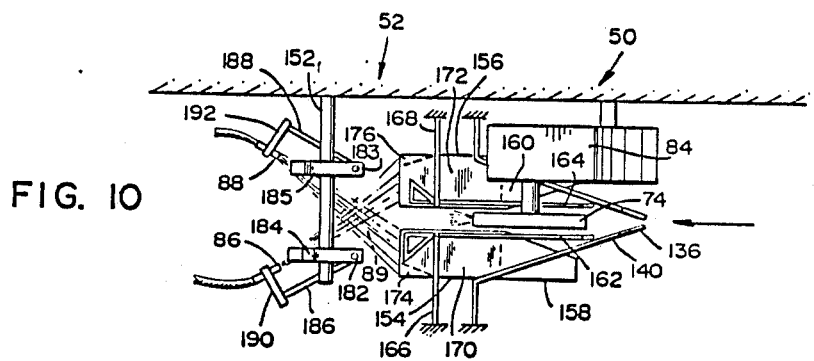
FIGS. 10 and 10a are top and side views, respectively of a portion of the inner liner removal processing station of FIG. 6.
Figure 10A:
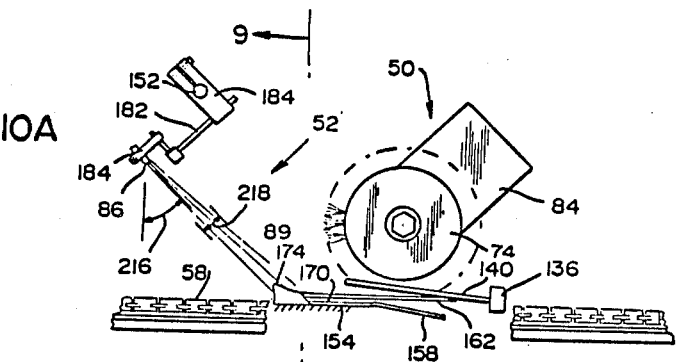
Figure 11:
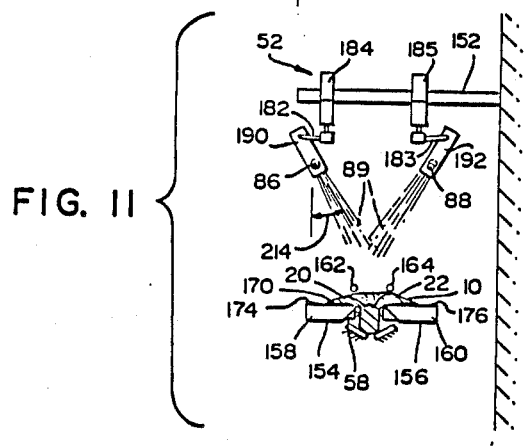
FIG. 11 is a view taken along XI—XI of FIG. 10.

Referring now to FIGS. 10, 10a and 11, inner liner removal processing work station 52 is disposed immediately following viscera removal station 50. As a catfish 10 leaves viscera removal processing station 50, it slides up angled support portions 158 and 160 on upstream ends of belly flap support plates 154 and 156 respectively. First and second hold-down rods 162 and 164 are disposed on support rods 166 and 168 generally parallel to the direction of travel. Upstream extremities of hold-down rods 162 and 164 extend beyond an axis of rotating brush 74 and between diverging legs 140 of viscera removal processing station 50. Thus, belly flaps 20 and 22, opened by diverging legs 140 of viscera removal processing station 50 are retained in the open position by hold-down rods 162 and 164. As catfish 10 advances, belly flap support plates 154 and 156 raise belly flaps 20 and 22 into contact with generally-horizontal hold-down rods 162 and 164. Belly flaps 20 and 22 become captured closely between hold-down rods 162 and 164 and horizontal portions 170 and 172, respectively. As best seen in FIG. 11, hold-down rods 162 and 164 spread belly flaps 20 and 22 tightly against horizontal portions 170 and 172 as catfish 10 advances. Upwardly inclined tabs 174 and 176 are disposed at lateral extremities of horizontal portions 170 and 172, respectively.

Spray nozzles 86 and 88 (spray nozzle 88 is hidden behind spray nozzle 86 in FIG. 10A) are supported on a spray nozzle support bridge 152. Spray nozzle support bridge 152 includes first and second clamps 184 and 185 in which first and second posts 182 and 183 may be fixed at adjustable angles. A auxiliary arm 186 is connected between an end of post 182 and a nozzle clamp 190. Nozzle clamp 190, in turn, holds spray nozzle 86 in a manner allowing its height and angle to be set in a pre-determined relationship to the remainder of inner liner removal processing station 52. Similarly, an auxiliary arm 188 is connected between an end of post 183 a nozzle clamp 192 holding spray nozzle 88 in a position whose height and angle can be adjusted.

Upwardly inclined tabs 174 and 175 turn up the extremities of belly flaps 20 and 22 thereby exposing such extremities to more direct impact by the water jets. This tends to counteract the reduced water flow and velocity experienced off the center lines of the water jets and thus permits adequate cleaning in these areas.

The height of spray nozzles 86 and 88 above belly flaps 20 and 22 is adjusted by the position of posts 182 and 183 in their respective clamps 184 and 185, respectively. Roll angles 214 (FIG. 11) of spray nozzles 86 and 88 are adjusted by clamping nozzle clamps 190 and 192 in desired angular positions on posts 182 and 183. A pitch angle 216 of spray nozzles 86 and 88 (FIG. 10A) is adjusted by loosening bolt 192 and rotating compression clamp 190 about shaft 194. A spray fan angle 218 (FIG. 10A) in the direction of travel of catfish 10 is controlled by conventional means in spray nozzles 86 and 88 to a required value.

The effectiveness of the water jet in removing the black inner liner depends on a combination of the water pressure, distances, and angles. On a particular run of catfish 10, water pressures substantially below about 400 PSIG, produced less than complete cleaning of the black inner liner. Water pressures from about 400 to about 500 PSIG appear to give satisfactory cleaning. Satisfactory results are obtained with spray nozzles 86 and 88 positioned about 7 inches above belly flap support plates 154 and 156, a pitch angle 216 of about 60 degrees, a roll angle 214 of about 45 degrees and spray fan angle 218 of about 20 degrees.

The above parameters interact with each other. Excessive water pressure, combined with incorrect distance and angle parameters, may result in droplet sizes and velocities capable of damaging the flesh of catfish 10. At shorter distances, appropriate for smaller catfish 10, lower water pressures such as, for example, about 200 PSIG, may be employed after possible adjustment of at least some of the remaining parameters.

Although the scope of the invention should not be affected by any theory of operation, it is believed that the water pressure, distance and fan angle produce water droplets of an effective size and moving with an effective velocity to remove the inner liner. The effectiveness of removal is optimized by the roll and pitch angles.

Spray nozzles 86 and 88 are shown with pitch angle 216 inclined against the direction of fish travel. An embodiment in which pitch angle 216 is inclined in the direction of fish travel is equally within the contemplation of the invention.

It is believed that inner liner removal processing station 52 is effective for removing the black inner liner even when prior-art evisceration techniques are employed. Thus, inner liner removal processing station 52 should be Considered a stand-alone invention. It appears, however, than the action of rotating brush 60 and rotating brush 74 (FIG. 6) break a central portion of the black inner liner, thereby improving the effectiveness of inner liner removal processing station 52.

Figure 12:
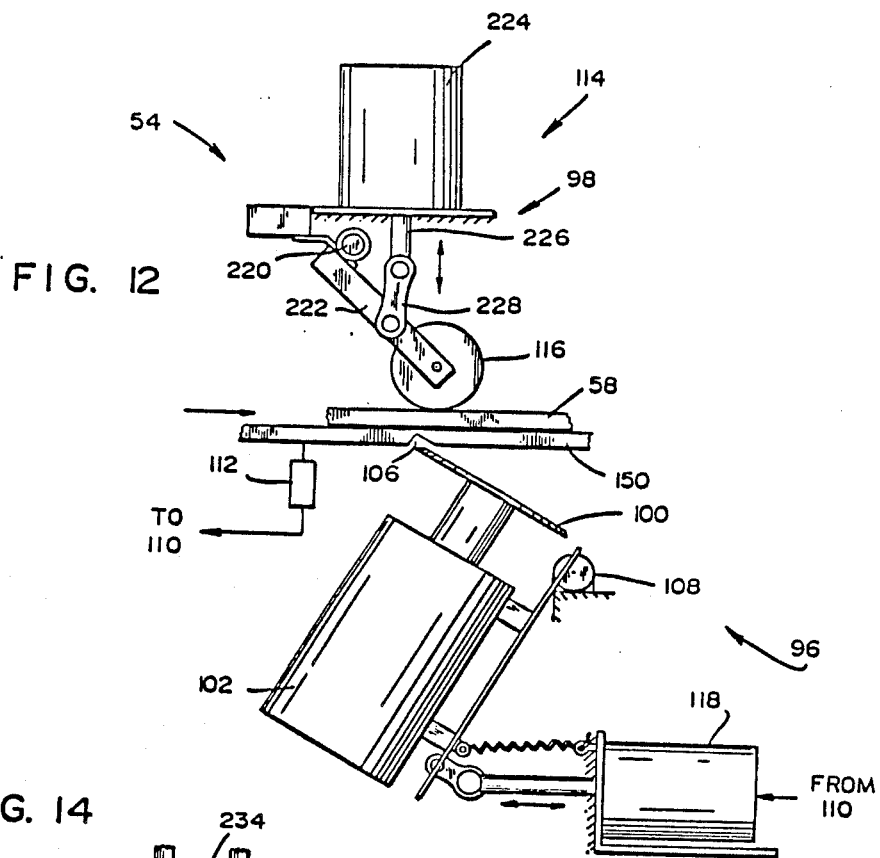
FIG. 12 is a side view of the knife subsystem of FIG. 6.
Figure 13:
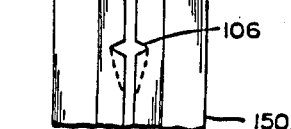
FIG. 13 is a partial view of the angled bottom support of FIG. 12.

Referring now to FIGS. 12 and 13, the description of elements of knife subsystem 96 of dorsal fin removal processing station 54 previously of pressure roller subsystem 98 is pivoted to an axis 220 by a shaft 222. A linear actuator 224 includes an actuator shaft 226 linked to shaft 222 through a swing link 228. Knife actuator 118 and linear actuator 224 may be of any conventional type including electrical and hydraulic, however, hydraulic appears preferable because of its faster response and finer control.

Figure 14:
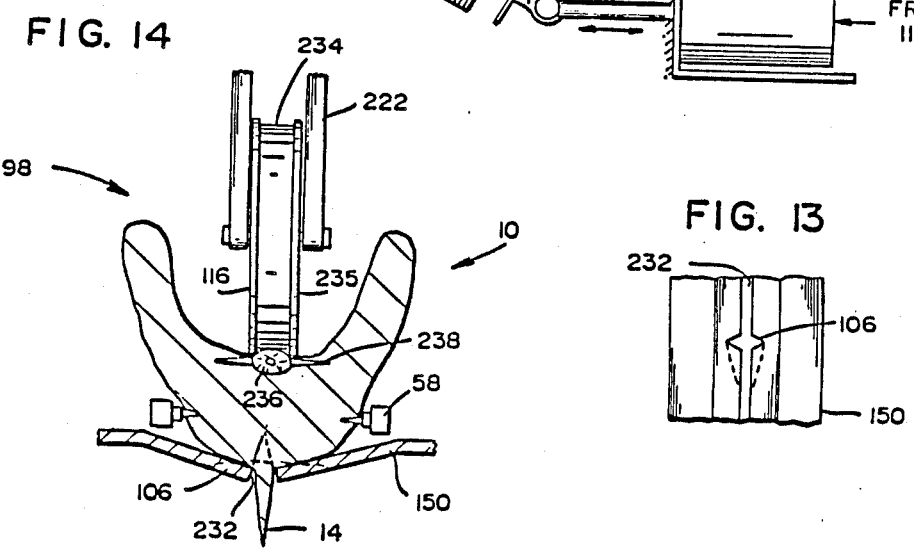
FIG. 14 is a view, rotated 90 degrees from the view of FIG. 13, showing a catfish being held down by the pressure roller.

Referring now also to FIG. 14, a longitudinal slot 232 in angled bottom support 150 permits dorsal fin 14 to enter, and extend through angled bottom support 150. Pressure roller 116 includes a groove 234 flanked by ridges 235 on its bearing surface. The cross section of catfish 10 shows a vertebral column 236 to which are attached lateral vertebral appendages 238.

Prior to the leading portion of dorsal fin 14 reaching notch 106, linear actuator 224 is actuated to urge pressure roller 116 downward against catfish 10. Groove 234 permits entry of vertebral column 236 therein, whereby ridges 235 are enabled to apply a downward force on lateral vertebral appendages 238. In combination, groove 234 aids in centering dorsal fin 14 in longitudinal slot 232 and the downward force applied by ridges 235 on lateral vertebral appendage 238 aids in holding catfish 10 erect while urging the back of catfish 10 downward against angled bottom support 150, whereby a maximum extension of dorsal fin 14 through longitudinal slot 232 is attained. As the leading portion of dorsal fin 14 approaches notch 106, knife actuator 118 is actuated to rotate the cutting edge of rotary knife 100 into notch 106 and to maintain it in that position for a time sufficient to permit the trailing portion of dorsal fin 14 to pass the cutting edge. Knife actuator 118 then rotates rotary knife 100 out of notch 106, thereby limiting the amount of flesh removed from catfish 10 along with dorsal fin 14. Linear actuator 224 then rotates pressure roller 116 out of the body cavity of catfish 10 before it contacts the rear of the body cavity.

Figures 15, 16:
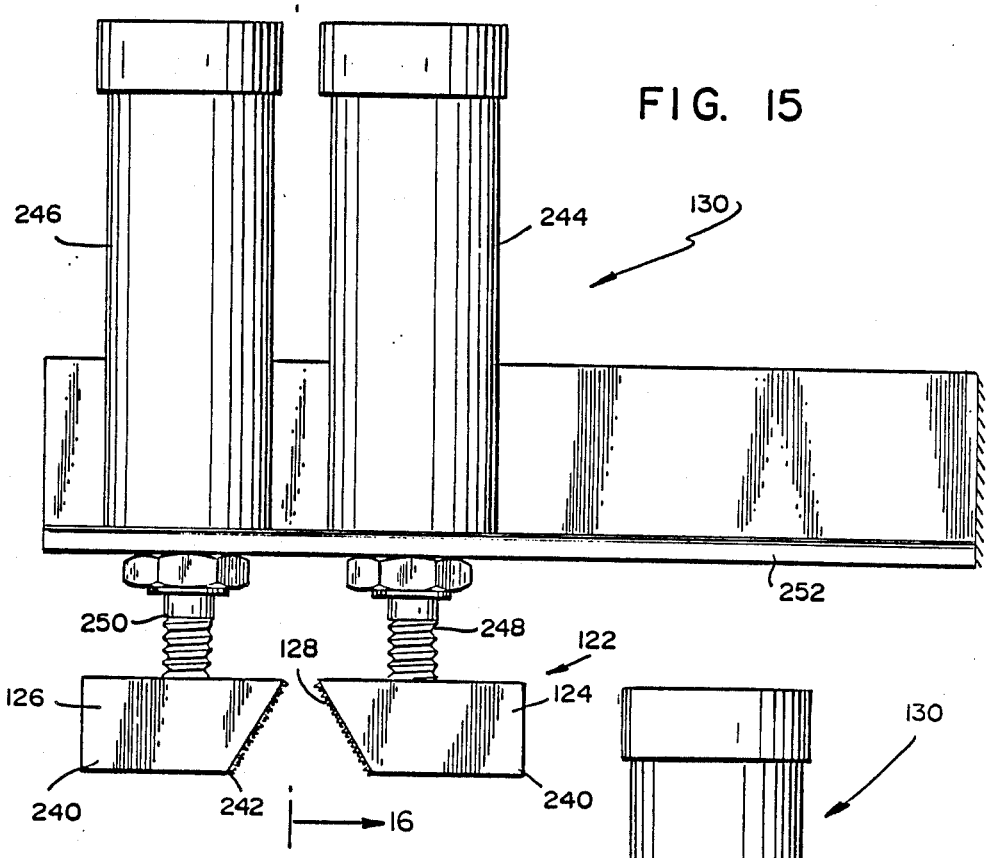
FIG. 15 is an end view of the intestine-removal control of FIG. 6.
FIG. 16 view taken along XVI—XVI of FIG. 15.

Referring now to FIGS. 15 and 16, snaggle plates 124 and 126 each includes a block 240 having an inclined face 242 upon which back-pointing pins 128 are mounted. Intestine-removal control 130 includes first and second linear actuators 244 and 246 which may be, for example, hydraulic cylinders. Piston shafts 248 and 250 of linear actuators 244 and 246 are connected to snaggle plates 124 and 126, respectively. Intestine-removal control 130 is secured to stationary parts of the apparatus by, for example, an angle iron 252. As shown in the side view in FIG. 16, a guide rod 254 is affixed to snaggle plate 124 (and a corresponding guide rod is affixed in snaggle plate 126). Guide rod 254 passes through a guide hole 256 in angle iron 252 for resisting rotation of snaggle plate 124 about an axis of piston shaft 248. The inclinations of inclined faces 242 are established at values which generally match the inclinations of the sides of catfish 10 in the vicinity of the rear of the body cavity.

Back-pointing pins 128 are preferably disposed in a staggered linear array in which the cross-travel positions of back-pointing pins 128 in one row lies intermediate the cross-travel positions of those in adjacent rows. In one embodiment, back-pointing pins 128 are about 0.8 mm in diameter and extend about 2 mm from the surface of inclined face 242. In this embodiment, each back-pointing pin 128 is inclined from about 10 to about 15 degrees against the direction of travel. A spacing of about 4 mm between back-pointing pins 128 in a row and a spacing of about 3 mm between rows appears to be satisfactory.

Although ends of back-pointing pins 128 may be sharpened, we have discovered that such sharpening may be unnecessary. The above size, length, spacing and inclination of back-pointing pins 128 is effective to capture and remove intestinal fragment 32 without requiring sharpening. The absence of sharpening by also reduce damage to exterior portions of catfish 10 which may be contacted by snaggle plates 124 and 126.

Linear actuators 244 and 246 are controlled to urge snaggle plates 124 and 126 downward placing back-pointing pins 128 into contact with the sides of catfish 10 at about the time that intestinal fragment 32 (not shown) hanging down outside on one side or the other of catfish 10 is expected to under them. The lengths of snaggle plates 124 and 126 are sufficient to accommodate variations in the positions of intestinal fragments 32 and uncertainties in the lengths of catfish 10, as well as the locations of anal vents 24 therein.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for processing fish, said fish having had its head removed and its belly slit, comprising:
   a conveyor;
   said conveyor including means for moving said fish along a predetermined path with said belly uppermost;
   at least one processing station;
   said at least one processing station including a rotating brush;
   means for spreading belly flap of said fish to reveal an interior of said belly; and
   means for controlling a position of said rotating brush for bringing a perimeter thereof into contact and out of contact with a predetermined portion of said interior, wherein said means for controlling are capable to control said position during the operation of said apparatus, said means of controlling, comprising means for exerting a predetermined hold-down force of said brush, whereby at least a portion of viscera are removed from said interior.

2. Apparatus according to claim 1 wherein said at least first and second processing stations:
   at least one processing station includes:
   said first processing station including a first rotating brush;
   said means for controlling a position including first means for controlling said first rotating brush between first and second positions;
   said first position being out of contact with said interior, and said second position being in contact with a first portion of said interior;
   said first means for controlling including means for exerting a first predetermined hold-down force of said brush in said second position;
   said means for controlling a position further including second means for controlling said second rotating brush between third and fourth positions;
   said third position being out of contact with said interior, and said fourth position being in contact with a second portion of said interior;
   said second means for controlling including means for exerting a second predetermined hold-down force of said second brush in said fourth position; and
   said first portion including less than all of said interior and said second portion including all of said interior.

3. Apparatus according to claim 2 wherein said first brush includes bristles having at least one of a different length and a different diameter from bristles on said second brush.

4. Apparatus according to claim 3 wherein said first portion of said interior includes a portion including a swim bladder of said fish and said length and stiffness of said bristles on said first rotating brush are effective for removing said swim bladder.

5. Apparatus according to claim 4 wherein said first hold-down force, in combination with said bristles is effective for removing said swim bladder.

6. Apparatus according to claim 2 wherein said second rotating brush includes bristles having lengths and diameters effective in combination with said second hold-down force for removing viscera from said interior without producing substantial damage to flesh of said fish.

7. Apparatus according to claim 2 wherein said first and second hold-down forces are substantially different.

8. Apparatus according to claim 1 wherein said at least one processing station includes:
   at least first and second processing stations;
   said first processing station including a first rotating brush;
   said means for controlling a position including first means for controlling said first rotating brush between first and second positions;
   said first position being out of contact with said interior, and said second position being in contact with a first portion of said interior;
   said first means for controlling including means for exerting a first predetermined hold-down force of said brush in said second position;

said means for controlling a position further including second means for controlling said second rotating brush between third and fourth positions;
said third position being out of contact with said interior, and said fourth position being in contact with a second portion of said interior:
said second means for controlling including means for exerting a second predetermined hold-down force of said brush in said fourth position; and
at least one of said first and second rotating brushes including at least one water nozzle in a perimeter thereof.

9. Apparatus for removing an inner liner from an interior of a fish comprising:
first and second nozzles;
means for spreading belly flaps of said fish;
means for moving said fish past said first and second nozzles;
means for delivering a flow of liquid at a predetermined pressure to said first and second nozzles; and
means for supporting said first and second nozzles at a distance from said fish, at a roll angle, and at a yaw angle effective, in combination with said flow of liquid for removing said inner liner.

10. Apparatus according to claim 9 further comprising:
first and second belly flap support plates for supporting exteriors of said first and second belly flaps;
first and second hold-down rods disposed a predetermined distance above said first and second belly flap support plates respectively; and
said predetermined distance being effective for fully spreading said first and second belly flaps for exposing said interior of said fish to said flow of liquid.

11. Apparatus according to claim 9, further comprising:
at least one rotating brush;
means for moving said at least one rotating brush into contact with at least a portion of an interior of said fish;
said means for moving including means for producing a hold-down force effective for holding said rotating brush against said at least one portion with a force effective for at least partly removing a central portion of said lining;
removal of said central portion taking place before said fish is contacted by said flow of liquid; and
said removal of said central portion being effective for enhancing an ability of said flow of liquid for removing said layer.

12. Apparatus for processing fish, said fish having had its head removed and its belly slit, comprising:
a conveyor;
said conveyor including means for moving said fish along a predetermined path with said belly uppermost;
at least one processing station;
said at least one processing station;
said at least one processing station including a rotating brush;
means for spreading belly flap of said fish to reveal an interior of said belly;
means for controlling a position of said rotating brush for bringing a perimeter thereof into contact with and out of contact with a predetermined portion of said interior whereby at least a portion of viscera are removed from said interior;
an inner liner removal station;
means for holding said belly flaps in a spread position;
means for producing a predetermined pressure in a liquid;
means for producing at least one spray fan of said liquid contacting said inner liner; and
said predetermined pressure and said means for producing at least one spray fan being effective, in combination for removing said inner liner.

13. Apparatus for processing a fish, said fish being a type having an inner liner within its belly, comprising:
at least one rotating brush;
a conveyor including means for moving said fish past said rotating brush;
means for opening belly flaps of said fish as it moves toward said rotating brush;
means for urging said rotating brush into contact with a predetermined portion of an interior of said fish;
said predetermined portion including a portion having said belly liner thereon;
first and second nozzles;
means for spreading belly flaps of said fish;
said means for spreading being disposed adjacent said means for opening whereby said belly flaps opened by said means for opening for contact of said rotating brush with said interior remain opened and are spaced by said means for spreading;
means for moving said fish past first and second nozzles;
means for delivering a flow of liquid at a predetermined pressure to said first and second nozzles;
said predetermined pressure being at least about 200 PSIG; and
means for supporting said first and second nozzles at a distance from said fish, at a roll angle, and at a yaw angle effective, in combination with said flow of liquid for removing said inner liner.

14. Apparatus according to claim 13 wherein said predetermined pressure is from about 200 to about 550 PSIG.

15. Apparatus according to claim 14 wherein said predetermined pressure is from about 400 to about 500 PSIG.

16. Apparatus for cleaning an inner liner from a belly of a fish, comprising:
means for opening said fish and for cleaning at least a portion of entrails therefrom;
first and second nozzles;
means for conveying said fish, with belly flaps thereof opened, past said first and second nozzles;
means for producing a predetermined water pressure;
means for feeding said water to said first and second nozzles;
first means for positioning said first nozzle at a first roll angle, a first pitch angle and a first yaw angle, and at a predetermined first distance from said fish as it passes therepast;
second means for positioning said second nozzle at a second roll angle, a second pitch angle and a second yaw angle, at a predetermined second distance from said fish as it passes therepast;
said first and second distances being substantially equal;
said roll pitch and yaw angles and said first and second distances being effective, in combination with said predetermined water pressure to remove said inner liner from said fish; and said predetermined water pressure being from about 200 to about 500 PSIG.

17. Apparatus according to claim 16 wherein said first distance is about 7 inches.

18. A method for cleaning a belly liner from a fish, comprising:
   opening a belly of a fish;
   removing a head of said fish;
   removing at least a portion of entrails of said fish;
   holding open belly flaps of said fish to reveal said belly liner;
   moving said fish past first and second nozzles;
   supplying pressurized water to said first and second nozzles at least while said fish moves therepast; and
   positioning said first and second nozzles at a distance and at roll, pitch and yaw angles which, together with said pressurized water is effective for removing said belly liner.

19. A method according to claim 18 wherein the step of supplying pressurized water includes supplying pressurized water at from about 200 to about 500 PSIG to said first and second nozzles.

* * * * *